(12) United States Patent
Springer et al.

(10) Patent No.: US 11,931,942 B2
(45) Date of Patent: Mar. 19, 2024

(54) METHOD FOR CONTROLLING OR REGULATING A CLOSING MECHANISM OF A MOULDING MACHINE

(71) Applicant: ENGEL AUSTRIA GmbH, Schwertberg (AT)

(72) Inventors: Klemens Springer, Leonding (AT); Friedrich Johannes Kilian, Neuhofen (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 1067 days.

(21) Appl. No.: 15/840,784

(22) Filed: Dec. 13, 2017

(65) Prior Publication Data

US 2018/0169922 A1    Jun. 21, 2018

(30) Foreign Application Priority Data

Dec. 15, 2016  (AT) .............................. A 51144/2016

(51) Int. Cl.
  *B29C 45/80* (2006.01)
  *B29C 45/66* (2006.01)
  *B29C 45/76* (2006.01)

(52) U.S. Cl.
  CPC ............ *B29C 45/80* (2013.01); *B29C 45/661* (2013.01); *B29C 45/7653* (2013.01); *B29C 2945/76936* (2013.01)

(58) Field of Classification Search
  CPC .......... B29C 45/80; B29C 2945/76013; B29C 2945/7602; B29C 2945/76083;
  (Continued)

(56) References Cited

U.S. PATENT DOCUMENTS 7,132,068 B2   11/2006  Hakoda et al.
7,381,043 B2    6/2008  Engleder
(Continued)

FOREIGN PATENT DOCUMENTS

AT        502 382      3/2007
CN       1676305      10/2005
(Continued)

*Primary Examiner* — Philip C Tucker
*Assistant Examiner* — Andrew L Swanson
(74) *Attorney, Agent, or Firm* — Wenderoth, Lind & Ponack, L.L.P.

(57) ABSTRACT

In a method for controlling or regulating a closing mechanism of a moulding machine, a first trajectory for the controlled or regulated movement of the movable platen is calculated using a first algorithm based on operator inputs relating to the desired movement of the movable platen, and the movable platen is moved in a controlled or regulated manner at least once according to the first trajectory. At least one dynamic or kinematic variable of the closing mechanism is measured during at least one of the movements of the movable platen according to the first trajectory, and an estimate of at least one parameter value is generated based on the measurement. A second trajectory for the controlled or regulated movement of the movable platen is calculated based on the estimate, and the movable platen is moved in a controlled or regulated manner according to the second trajectory.

6 Claims, 3 Drawing Sheets

(58) Field of Classification Search
CPC . B29C 2945/76113; B29C 2945/76227; B29C 2945/76387; B29C 2945/76568; B29C 2945/76598; B29C 2945/76943
See application file for complete search history.

(56) References Cited

U.S. PATENT DOCUMENTS

| | | |
|---|---|---|
| 9,573,190 B2 | 2/2017 | Poeppl et al. |
| 2005/0218544 A1* | 10/2005 | Hakoda ................ B29C 45/80 264/40.5 |
| 2007/0065531 A1 | 3/2007 | Engleder |
| 2015/0258605 A1 | 9/2015 | Poeppl et al. |

FOREIGN PATENT DOCUMENTS

| | | |
|---|---|---|
| CN | 104512016 | 4/2015 |
| CN | 104991533 | 10/2015 |
| CN | 105932911 | 9/2016 |
| DE | 10 2006 028 094 | 3/2007 |
| WO | 2014/048685 | 4/2014 |

\* cited by examiner

METHOD FOR CONTROLLING OR REGULATING A CLOSING MECHANISM OF A MOULDING MACHINE

BACKGROUND OF THE INVENTION

The present invention relates to a method for controlling or regulating a closing mechanism of a moulding machine, in which a movable platen is moved by a movement mechanism, and a moulding machine which can perform such controlling or regulating.

A generic method and a generic moulding machine are found in AT 502 382 B1.

The basic functionality of the optimization algorithm (using the example of an electric moulding machine, the method also being applicable to hydraulic moulding machines) for calculating the mathematically optimal trajectory according to AT 502 382 B1 is as follows:
Model of the optimizer:
  dynamic model of the toggle lever including all necessary masses and inertias such as e.g. the lever, drive components and platens
  consideration of the non-linear kinematics and translation
Consideration of the following limits
  jolt of the platen and of the crosshead
  motor characteristic (torque/rotational speed/characteristic line)
  maximum acceleration and speed for each point on the path of the platen and/or of the crosshead
Basic elements of the optimization algorithm:
  discretization of the optimization problem over the path
  formulation of the optimization problem as a system of linear equations
  reduction to a linear optimization problem
  calculation of an actual, travellable trajectory for the movable platen from the discretized points of the optimization algorithm (translation into a trajectory which the controller or regulator of the moulding machine can read).

A disadvantage of the generic method is that there are often no or only insufficient parameter values for kinematic or dynamic parameters of the closing mechanism before the optimization. For instance, both the inertias of the moving part of the mould, which change depending on the component produced, and the friction parameters, which depend on all parameters, are included in the dynamic equation of the optimization algorithm (parameter p). These are unknown per se and, for this reason, have to be estimated and predefined on the basis of the operator's experience. To be on the safe side, maximum values—optionally given by the technical data sheets—are usually used. This, in turn, leads to non-optimal optimization results, e.g. to a trajectory that is too slow in the case of an optimization purely of time.

SUMMARY OF THE INVENTION

The object of the invention is to provide a method in which, even on the basis of inputs by an inexperienced operator, an optimized trajectory for the controlled or regulated movement of the movable platen can be calculated, and to provide a moulding machine which can calculate an optimized trajectory for the controlled or regulated movement of the movable platen even on the basis of inputs by an inexperienced operator.

The core of the invention is an optimization on the basis of the estimation of an initially unknown or imprecisely known parameter value. A first trajectory can be determined e.g. using the state of the art according to AT 502 382 B1 and with predefined parameter values for dynamic variables of the closing mechanism. This first trajectory can also be travelled, and usually leads to clearly improved results compared with adjustments which are carried out by hand or using conventional ramps. However, the generation of a first trajectory on the basis of an operator input by hand or using conventional ramps is quite possible.

The measurement of at least one dynamic variable of the closing mechanism (such as, for instance, the actual acceleration of the movable platen or of a part of the movement mechanism and/or the motor torque) during at least one of the movements of the movable platen according to the first trajectory makes it possible, in a later step, to generate an estimate for the hitherto predefined, but in fact unknown or only imprecisely known parameter or parameters. With the aid of model-based estimators or conventional identification algorithms such as the method of least squares for over-determined systems, the unknown parameters—often lengths, mass inertias and friction parameters—can be estimated.

These methods enable, precisely in the case of fast movements, which an optimum trajectory of a toggle lever closing element certainly is, a precise estimation of unknown or only imprecisely known parameters, if the parameters are in the observable subspace of the dynamic or kinematic model.

With these identified or at least more precisely estimated estimates for the parameter or parameters, the optimization algorithm can now be carried out with the boundary conditions and the optimization criterion, which leads to a second, improved trajectory. The movable platen can then be moved in a controlled or regulated manner according to the second trajectory.

It is thus to be understood that the movable platen is first moved in a regulated or controlled manner according to a first trajectory and, while the movement is being implemented according to this first trajectory, at least one dynamic or kinematic variable of the closing mechanism is measured. With the aid of the measured variable and by means of an optimization algorithm, a second trajectory is now calculated which, after calculation, is used for the controlled or regulated movement of the movable platen. In other words, according to the present invention a (first) trajectory is implemented first in order to determine at least one measurement value. This at least one measurement value is then used in the calculation of a (second) trajectory deviating from the first trajectory, which facilitates an optimized movement of the movable platen.

Thus, according to the invention, a first (target) trajectory is implemented first in order to obtain measurement values and then an improved second (target) trajectory is defined by the determined measurement values of the implementation of the first (target) trajectory. Through this procedure, a second (target) trajectory different from the first (target) trajectory is created.

The point of the invention is thus not that a target trajectory is implemented, an actual trajectory is measured and then the actual trajectory is brought closer to the target trajectory (as is known as a regulation principle through the state of the art).

Naturally, it is possible to set the optimization algorithm as the first algorithm and, as it were, to carry out an iterative optimization by repeated application of the optimization algorithm. The iteration can be carried out as often as desired.

This iteration of calculation of a first trajectory and identification (in the form of an estimation based on a measurement) of the parameters with the aid of the measured, first trajectory on the moulding machine leads to the calculation of an actual optimum trajectory in the form of the second trajectory. Importance should be attached to the numerical and iterative stability of both the estimation of the parameter and the optimization algorithm, in order not to obtain results in limit cycles. This is easily possible for a person skilled in the art.

Thus, for standard applications, the operator only has to enter as few input parameters as necessary and nevertheless obtains an optimum trajectory for the controlled or regulated movement of the platen.

It is conceivable for the operator to enter the following parameters:
- closing stroke
- mould protection
- plate contact speed, i.e. the speed at which the movable platen comes into contact with a further, usually stationary platen of the moulding machine The parameters entered by the operator are translated into mathematical limits for the first algorithm or the optimization algorithm. In addition, these are paired with parameters of certain machine components (such as for instance motor characteristics or maximum spindle or pump loads).

The first algorithm has to rely on certain, normally unknown or only imprecisely known, parameters, such as for instance the friction parameters. It can now approximate these for the calculation of the first trajectory using an estimate (e.g. the maximum value).

When all the parameters for the optimization are present, this can be carried out, e.g. according to AT 502 382 B1.

The movement on the basis of the first trajectory provides information for the optimization algorithm.

After the estimation of the parameter or parameters has been carried out, these should be checked before they are used as the basis of the calculation of the second trajectory. Obviously meaningless results (such as e.g. negative friction parameters) can thus be discarded. After the calculation of the second trajectory has been carried out using the optimization algorithm, the suitability of the second trajectory should be checked. If, e.g., the second trajectory is worse than the first trajectory with respect to the quality criterion, the second trajectory can be discarded and a new estimation of the parameter or parameters is carried out, as well as the calculation of a new second trajectory on the basis of the newly estimated parameter or parameters.

For the calculation of the second trajectory, it can be necessary to carry out the movement according to the first trajectory several times, e.g. because the calculation lasts longer or in order to find an average.

It may be noted that the term "operator" can refer to both a human being and another machine.

BRIEF DESCRIPTION OF THE DRAWINGS

Examples of the invention will be discussed below with reference to the drawings, in which.

DETAILED DESCRIPTION OF THE INVENTION

Figure 1:
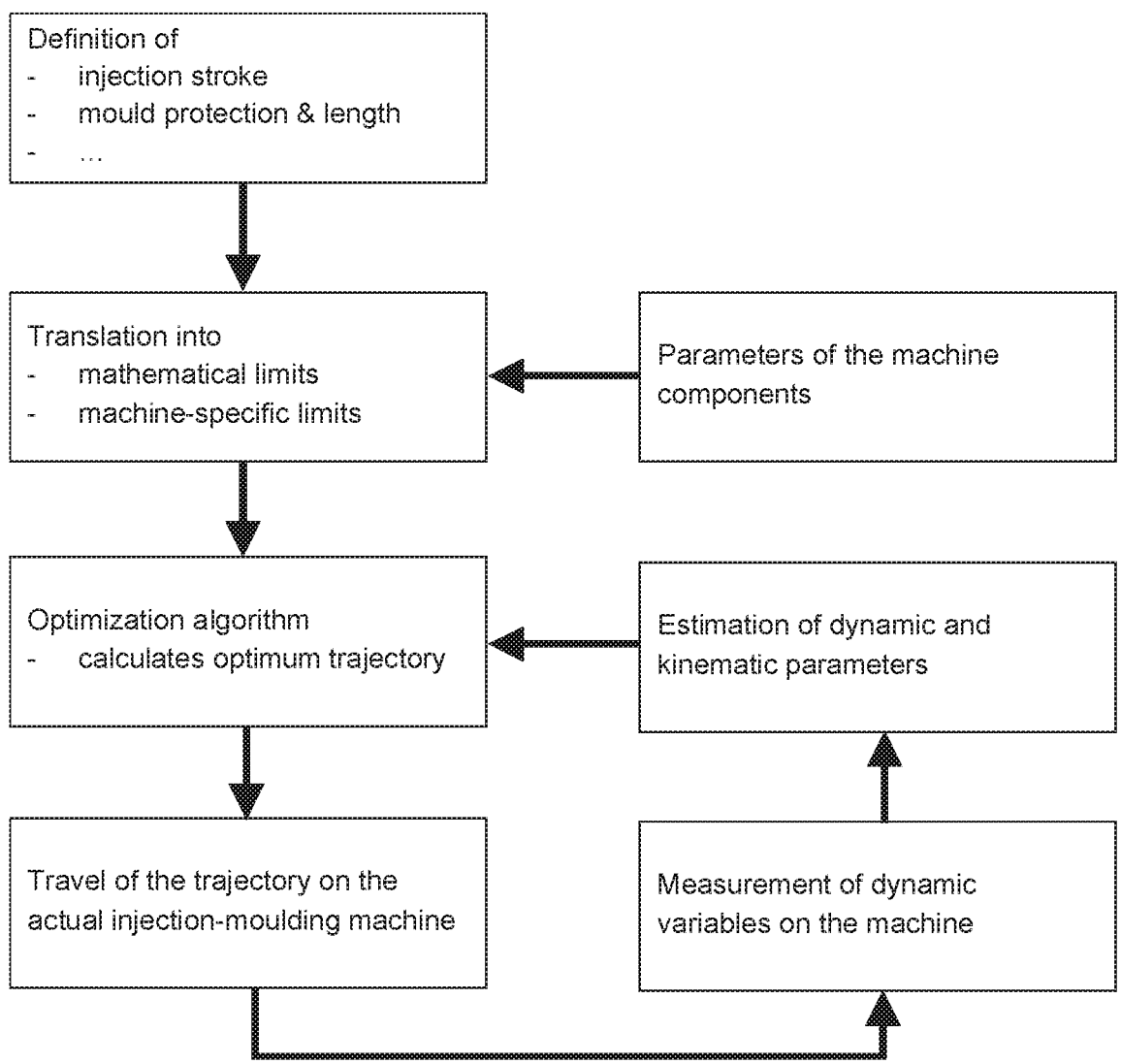
FIG. 1 is a schematic representation of an embodiment of the method according to the invention. In this embodiment, the optimization algorithm 5 is also used as a first algorithm 4 in order to calculate a first trajectory. With reference to the measurement results, using estimated dynamic and kinematic parameters, again using the optimization algorithm 5, a second trajectory can be obtained. Although this procedure can be repeated as often as desired, one pass through the loop should normally be sufficient.
Figure 2:
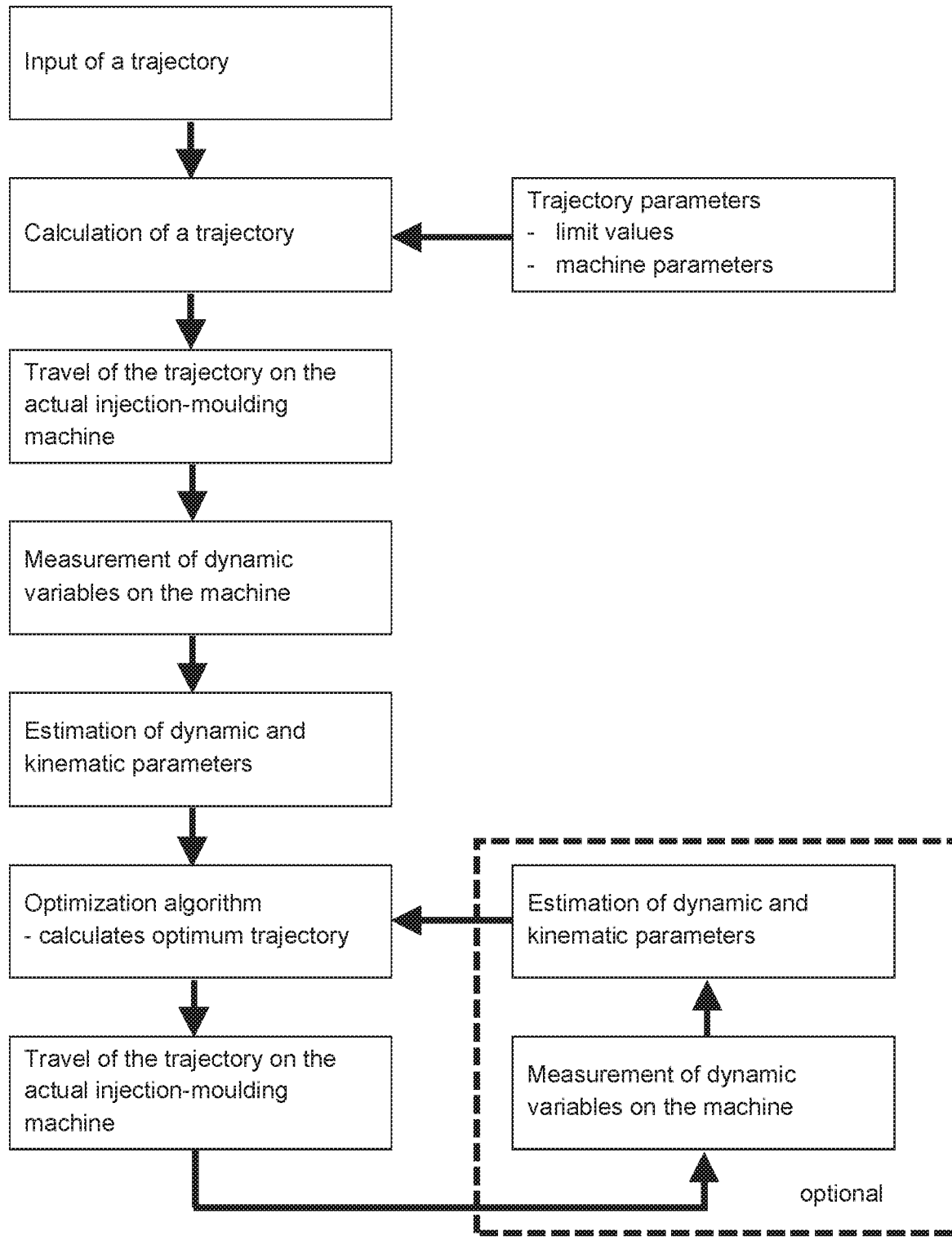
FIG. 2 is a schematic representation of a further embodiment of the method according to the invention, in which the above-discussed use of the optimization algorithm 5 as a first algorithm 4 (loop) is only optional. The first trajectory can be entered or calculated as desired by means of a first algorithm 4 different from the optimization algorithm 5.

A moulding machine 1 in the form of an electric toggle clamp machine carries out both the closing movement and the build-up of closing force with a toggle lever (through the suitable translation of the toggle lever). The closing movement and the build-up of closing force should be carried out optimally with respect to different criteria, taking into consideration certain boundary conditions.

Possible boundary conditions are:
- The desired moulding stroke (injection stroke), this is predefined by the operator and is determined by the mould and its properties.
- Machine limitations, such as maximum motor torques, currents in the motors and converters, maximum movement speeds and changes in speed or changes in acceleration in mechanical components such as spindles or bearings.
- Mould protection, i.e. maximum speed of the mould at the time of closing and maximum speed progression immediately before the mould is closed, in order to protect the mould from destruction and to facilitate necessary braking.

A possible optimization criterion is
- the cycle time, which includes, as an essential element, both the closing time and the time needed for the build-up of closing force.

The boundary conditions, as well as the optimization criterion, have to be formed into basic mathematical equations before an optimization in a known manner. Although the hard boundary conditions, such as for instance the moulding stroke or the maximum regulator voltage, are easily describable, they have to be parameterized specifically for each moulding machine 1. With the aid of a linking between machine data and component data, the boundary conditions can be determined. In most cases, this occurs via a technical database of the components built into a moulding machine 1 in which the parameters of the machine components are stored.

In addition, the dynamic model which is to be complied with in an equivalent manner as a boundary condition (both in reality and in the case of correct parameterization within the mathematical model) is much more complex and is usually represented in the form:

$$m(x,p)\ddot{x}+g(x,\dot{x},p)=f(x,u,p),$$

wherein "x" is the movement, "m" represents the inertia terms, "u" represents the input (e.g. current or torque) and "p" represents known and unknown parameters.

In addition to the boundary conditions, the optimization criteria have to be represented by a mathematical formulation. The simplest and trivial representation is the quality functional J, which represents the movement time:

$$J = \int_0^{x\_end} \frac{1}{\dot{x}} dx.$$

Due to the combination of time and movement limits, such as for instance the ratio between time and jolt, the representation of the quality functional can become much more complex. On the other hand, an energy function can also be included in the quality functional.

With the aid of suitable algorithms, such as for instance with the aid of the optimization algorithm described in AT 502 382 B1, a first trajectory can thus be calculated for the chosen boundary conditions with the linking of machine data and component data.

The movable platen is moved by the movement mechanism in a controlled or regulated manner according to the first trajectory and the at least one dynamic or kinematic variable of the closing mechanism for which only a predefined parameter value was present in the calculation is measured.

On the basis of the measurement, an estimate of the at least one parameter value predefined for the calculation of the first trajectory is generated.

On the basis of the estimate, using the optimization algorithm, a second trajectory for the controlled or regulated movement of the movable platen is calculated, and the movable platen is moved in a controlled or regulated manner according to the second trajectory.

Figure 3:
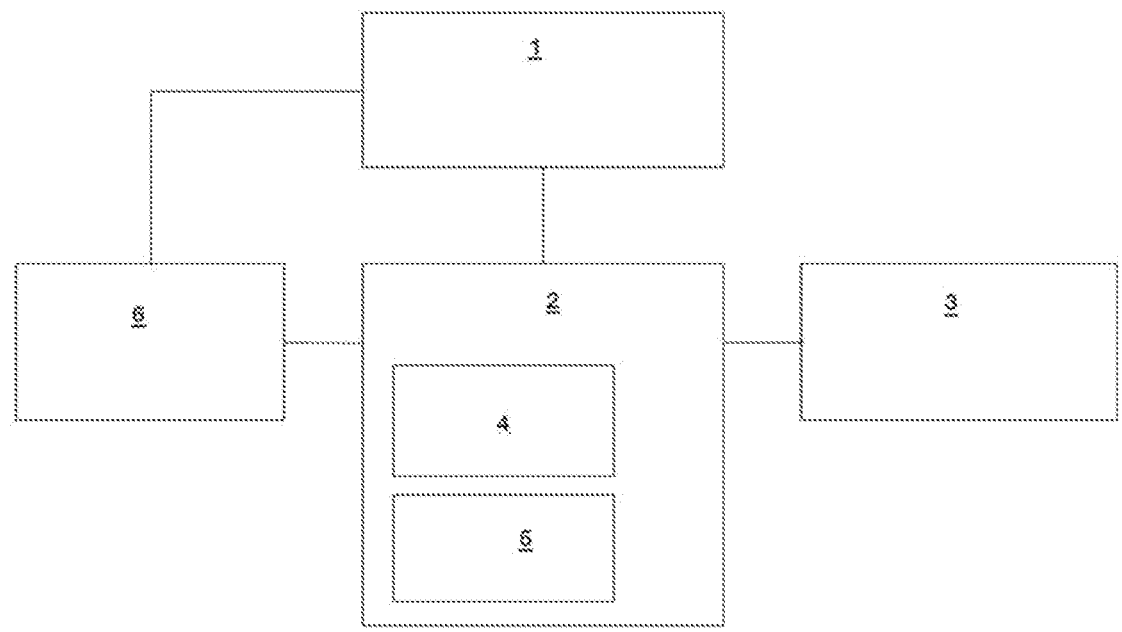
FIG. 3 is a schematic representation of a moulding machine according to the invention.

FIG. 3 schematically shows a moulding machine 1 with a closing mechanism (which is not represented in more detail because it corresponds to the state of the art) which includes a movable platen and a movement mechanism for the movable platen. In addition, FIG. 3 schematically represents:

- a control or regulation device 2 for controlling or regulating the movement of the movable platen by the movement mechanism,
- an operator interface 3 for entering operator inputs into the control or regulation device 2,
- a first algorithm 4 for calculating a first trajectory for the controlled or regulated movement of the movable platen on the basis of operator inputs entered via the operator interface 3 and relating to the desired movements of the movable platen and, in particular, on the basis of at least one predefined parameter value for at least one dynamic or kinematic variable of the closing mechanism, and
- a measurement device 6 for measuring the at least one dynamic or kinematic variable of the closing mechanism during at least one movement of the movable platen according to the first trajectory.

The control or regulation device 2 is formed:

- to generate an estimate of the at least one parameter value on the basis of the measurement,
- to calculate a second trajectory for the controlled or regulated movement of the movable platen on the basis of the estimate, using an optimization algorithm 5, and
- to control or regulate the movement of the movable platen by the movement mechanism according to the second trajectory.

The first algorithm 4 and/or the optimization algorithm 5 can be stored, for example, in the control or regulation device. It can also be stored outside the moulding machine 1 in a manner accessible to the control or regulation device 2 (e.g., in a cloud).

The invention claimed is:

1. A method for controlling or regulating a closing mechanism of a moulding machine, in which a movable platen is moved by a movement mechanism, the method comprising:
   - calculating a first trajectory for the controlled or regulated movement of the movable platen using a first algorithm, the calculating of the first trajectory being based on operator inputs relating to a desired movement of the movable platen and based on at least one predefined parameter value for at least one dynamic or kinematic variable of the closing mechanism;
   - moving the movable platen in a controlled or regulated manner at least once according to the first trajectory;
   - measuring at least one dynamic or kinematic variable of the closing mechanism during at least one of the movements of the movable platen according to the first trajectory;
   - generating an estimate of at least one parameter value based on the measuring of the at least one dynamic or kinematic variable of the closing mechanism;
   - calculating a second trajectory for the controlled or regulated movement of the movable platen based on the estimate; using an optimization algorithm; and
   - moving the movable platen in a controlled or regulated manner according to the second trajectory.

2. The method according to claim 1, wherein the optimization algorithm is used as the first algorithm.

3. A moulding machine comprising:
   - a closing mechanism including a movable platen and a movement mechanism for moving the movable platen;
   - a control or regulation device for controlling or regulating a movement of the movable platen by controlling the movement mechanism;
   - an operator interface for allowing entry of operatory inputs into the control or regulation device;
   - a first algorithm for calculating a first trajectory for the controlled or regulated movement of the movable platen based on the operatory inputs entered via the operator interface relating to a desired movement of the movable platen, and based on at least one predefined parameter value for at least one dynamic or kinematic variable of the closing mechanism; and
   - a measurement device for measuring the at least one dynamic or kinematic variable of the closing mechanism during at least one movement of the movable platen according to the first trajectory;
   - wherein the control or regulation device is configured to generate an estimate of at least one parameter value,
   - wherein the control or regulation device is further configured to calculate a second trajectory for the controlled or regulated movement of the movable platen based on the estimate, using an optimization algorithm, and
   - wherein the control or regulation device is further configured to control or regulate the movement of the movable platen by controlling the movement mechanism according to the second trajectory.

4. The moulding machine according to claim 3, wherein the moulding machine is an injection-moulding machine.

5. The moulding machine according to claim 4, wherein the first algorithm is the optimization algorithm.

6. The moulding machine according to claim 3, wherein the first algorithm is the optimization algorithm.

* * * * *